United States Patent
Anraku et al.

(10) Patent No.: US 8,316,510 B2
(45) Date of Patent: Nov. 27, 2012

(54) WALK-BEHIND WORK MACHINE

(75) Inventors: Genki Anraku, Wako (JP); Keisuke Hosokuni, Wako (JP); Toshiro Uchida, Wako (JP); Nobuyuki Hirose, Wako (JP); Shoji Hasei, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 13/044,762

(22) Filed: Mar. 10, 2011

(65) Prior Publication Data

US 2011/0239813 A1    Oct. 6, 2011

(30) Foreign Application Priority Data

Mar. 30, 2010   (JP) ................... 2010-078713

(51) Int. Cl.
    *B62D 51/00*    (2006.01)
(52) U.S. Cl. ......................................... 16/437
(58) Field of Classification Search ........... 16/437, 16/436, 113.1, 429, 426; 15/22.1, 323, 320, 15/410; 56/10.8, 14.8, 11.1, 11.3, 16.7, 2, 56/DIG. 18; 180/19.3, 19.2, 19.1, 324, 332, 180/333, 336; 172/42; 280/47.371
    See application file for complete search history.

(56) References Cited

U.S. PATENT DOCUMENTS

| | | | | |
|---|---|---|---|---|
| 2,727,753 A * | 12/1955 | Johnson et al. | ............ | 280/655.1 |
| 2,965,386 A * | 12/1960 | Buske | ...................... | 280/47.371 |
| 3,132,835 A * | 5/1964 | Drabert | ......................... | 248/397 |
| 3,421,177 A * | 1/1969 | Broghammer | .................. | 16/263 |
| 4,720,895 A * | 1/1988 | Peebles | ........................... | 16/264 |
| 4,811,968 A * | 3/1989 | Bolden | .......................... | 280/652 |
| 5,842,329 A * | 12/1998 | Carter | ................................. | 56/2 |
| 6,779,804 B1 * | 8/2004 | Liu | ............................. | 280/47.38 |
| 7,412,753 B2 * | 8/2008 | Osborne et al. | .................. | 16/437 |

FOREIGN PATENT DOCUMENTS

| CN | 201294749 Y | 8/2009 |
|---|---|---|
| EP | 1763986 A2 | 3/2007 |
| JP | 1-121320 | 8/1989 |

* cited by examiner

*Primary Examiner* — Chuck Y. Mah

(74) *Attorney, Agent, or Firm* — Rankin, Hill & Clark LLP

(57) ABSTRACT

A walk-behind work machine having a foldable operating handle is disclosed. The operating handle is swingable and foldable about a first linking pin relative to a handle-attachment part of a work-machine body from a usage position to a storage position and can be locked in a usage position by a second linking pin. The second linking pin is present on one of the operating handle and the handle-attachment part, and the distal end part of the second linking pin is formed in a tapered shape. The other of the operating handle and the handle-attachment part has a second pin-fitting hole allowing insertion and retraction of the distal end part. When the distal end part is fit into the second pin-fitting hole, no gap is present in the second pin-fitting hole due to the tapered surface of the distal end part, and the operating handle is locked in the usage position.

2 Claims, 8 Drawing Sheets

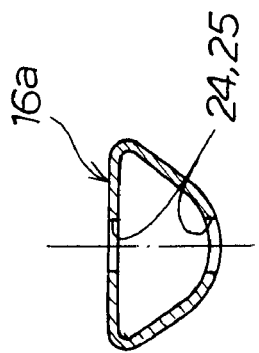
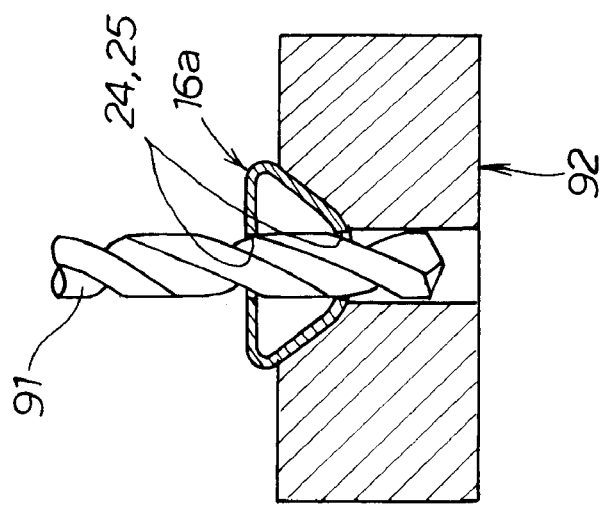
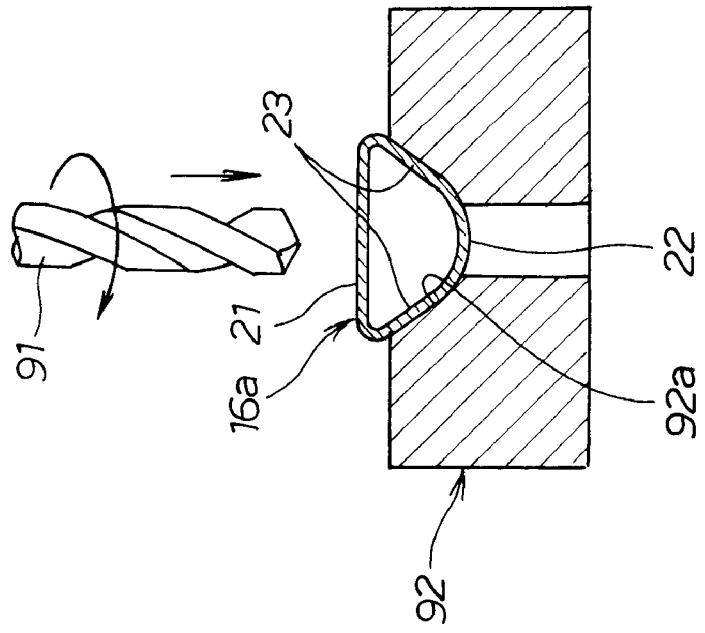

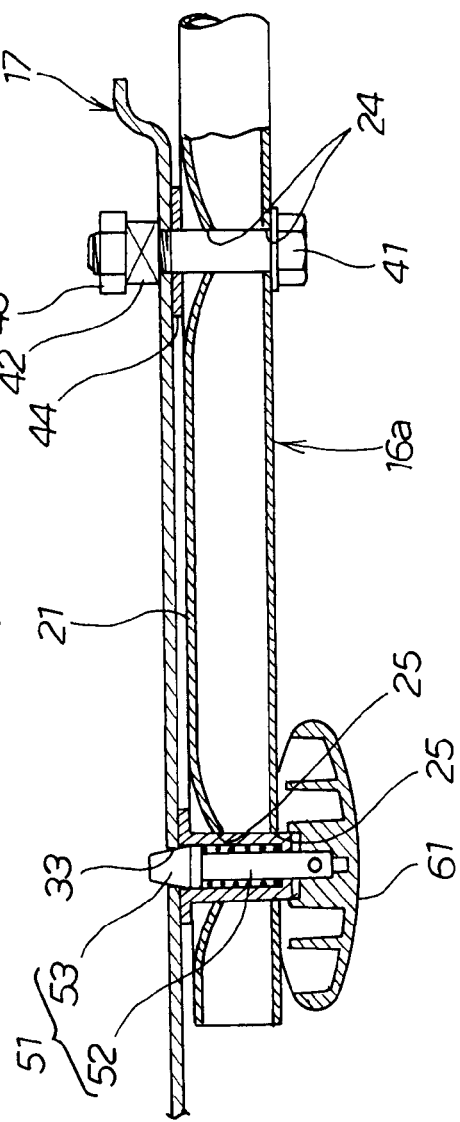

WALK-BEHIND WORK MACHINE

FIELD OF THE INVENTION

The present invention relates to a walk-behind work machine and, more particularly, to an improved attachment structure for a foldable operating handle of such a work machine.

BACKGROUND OF THE INVENTION

A walk-behind work machine has an operating handle for the operator to steer while walking, and travels under motor power or manpower. In some formats of a walk-behind work machine, the operating handle can be folded from a usage position to a storage position. If a foldable operating handle is employed, folding the operating handle allows the space occupied by the entire walk-behind work machine to be reduced. Little space is therefore needed when transporting or storing the walk-behind work machine. An example of a lawnmower that is a walk-behind work machine of the foldable-handle format is disclosed in Japanese Utility Model Application Laid-Open Publication No. 01-121320 (JP-U H01-121320 A).

In the walk-behind lawnmower of JP-U H01-121320 A, the operating handle can fold about a first linking pin with respect to a handle-attachment part of the work-machine body from a usage position to a storage position. The operating handle can be locked in the usage position by a second linking pin. The handle-attachment part and the operating handle have first and second fitting holes into which the first and second linking pins respectively fit.

It shall be apparent that gaps are present between the first linking pin and the first fitting hole, and between the second linking pin and the second fitting hole. The first and second linking pins can therefore be readily inserted into and retracted from the first and second fitting holes. However, such gaps are disadvantageous as concerns limiting relative vibration (wobbling, rattling) of the operating handle with respect to the handle-attachment part. Accordingly, there is scope for improvement in keeping the operating handle in a stably locked state in relation to the handle-attachment part when the operating handle is locked in the usage position.

SUMMARY OF THE INVENTION

It is an object of the present invention to provide enabling technology for keeping an operating handle in a stably locked state in relation to a handle-attachment part when the operating handle is locked in the usage position.

According to the present invention, there is provided a walk-behind work machine, which machine comprises: a work-machine body; a handle-attachment part provided to the work-machine body; and an operating handle linked to the handle-attachment part using a first linking pin and a second linking pin, wherein the operating handle is attached to the handle-attachment part so as to rotate about the first linking pin from a usage position to a storage position; one of the operating handle and the handle-attachment part has the second linking pin; the second linking pin has a distal end part; the distal end part has a tapered surface formed so that a diameter decreases toward a distal end; another of the operating handle and the handle-attachment part has a second pin-fitting hole within which the distal end part of the second linking pin extends and withdraws; and the operating handle is locked in the usage position when the distal end part of the second linking pin is fit into the second pin-fitting hole.

In the present invention, one of the operating handle and the handle-attachment part has the second linking pin, and the other of the operating handle and the handle-attachment part has a second pin-fitting hole. Fitting the distal end part of the second linking pin into the second pin-fitting hole allows the operating handle to be locked in the usage position. Pulling the distal end part of the second linking pin out of the second pin-fitting hole allows the operating handle to be folded from the usage position to storage position.

The distal end part of the second linking pin is formed in a tapered shape. Therefore, substantially no gap is present between the tapered surface of the distal end part and the second pin-fitting hole when the tapered surface is fit into the second pin-fitting hole. The operating handle can therefore be kept in a stably locked state with respect to the handle-attachment part when the operating handle is locked in the usage position. Specifically, relative vibration (wobbling or rattling) of the operating handle with respect to the handle-attachment part can be prevented from occurring. Vibration from, e.g., the engine or from the work machine itself is therefore not readily amplified when transmitted from the work-machine body to the operating handle via the handle-attachment part. The burden on the operator steering the walk-behind lawnmower can therefore be reduced.

In the walk-behind work machine, frequent repetition of operations for folding and unfolding the operating handle, as well as the large forces frequently acting on the operating handle during operation, may wear down the edge that forms the second pin-fitting hole, as well as the tapered surface. Since the distal end part of the second linking pin is formed to taper toward the distal end, substantially no gap is present between the tapered surface and the second pin-fitting hole even in such instances. The locked state of the operating handle with respect to the handle-attachment part can therefore be stably maintained for long periods of time.

Preferably, the operating handle has the first and second linking pins; the handle-attachment part has a first pin-fitting hole and the second pin-fitting hole, the first linking pin being inserted through the first pin-fitting hole; the operating handle has a first through-hole and a second through-hole, the first linking pin passing through the first through-hole, and the second linking pin passing through the second through-hole; and the first and second through-holes are round holes formed using a drill.

The first through-hole through which the first linking pin passes and the second through-hole through which the second linking pin passes are round holes formed using a drill. Using a hole-forming method in which a drill is employed thus allows the tolerance of the hole diameter to be relatively easily managed in comparison to using other methods for forming holes (using a press or another method). The fitting gap between the first through-hole and the first linking pin and the fitting gap between the second through-hole and the second linking pin can therefore readily be substantially eliminated. The operating handle can therefore be kept in a more stably locked state with respect to the handle-attachment part when the operating handle is locked in the usage position.

Desirably, the first linking pin comprises a bolt; and a member for screwing in the bolt comprises a welded nut welded to the other of the operating handle and the handle-attachment part, and a locknut used for further screwing-in of the bolt screwed into the welded nut, the member being a structure for locking the bolt in place using the two nuts.

The torque with which the bolt is fastened in the welded nut can therefore be readily managed. The bolt can be reliably fastened to the welded nut using optimal fastening torque so as to allow the operating handle to be folded about the first linking pin from the usage position to the storage position with respect to the handle-attachment part. After having been fastened, the bolt can be locked in place by the two nuts. The fastened state resulting from optimal fastening torque can be maintained for a prolonged period of time.

BRIEF DESCRIPTION OF THE DRAWINGS

A preferred embodiment of the present invention will be described in detail below, by way of example only, with reference to the accompanying drawings, in which:

FIGS. 9A through 9C are schematic views showing steps for using a drill to form a first and second through-holes of FIG. 4; and FIGS. 10A through 10E are diagrams showing steps for using press working to form the first and second through-holes of FIG. 4.

DETAILED DESCRIPTION OF THE PREFERRED EMBODIMENT

A lawnmower will be described as an example embodiment of a walk-behind work machine according to the present invention.

Figure 1:
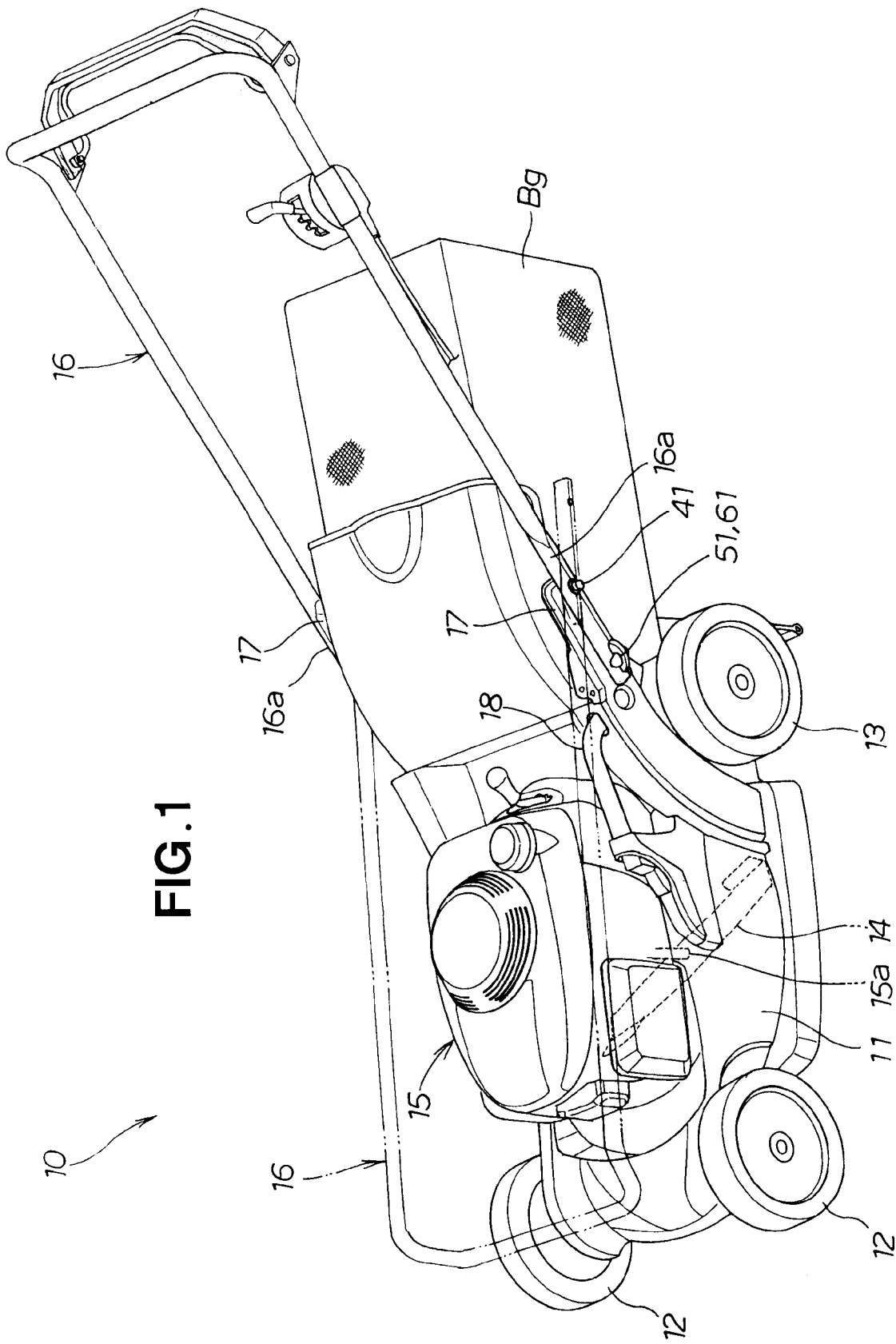
FIG. 1 is a perspective view showing a walk-behind lawnmower according to an embodiment of the present invention.

As shown in FIG. 1, a lawnmower 10 is a walk-behind self-propelled work machine for cutting grass, and is composed of a housing (work-machine body) 11 that is open at the bottom; left and right front wheels 12, 12 that are provided to the front part of the housing 11; left and right rear wheels 13, 13 that are provided to the rear part of the housing 11; a mowing blade 14 housed in the central interior part of the housing 11; an engine 15 provided to the upper part of the housing 11; an operating handle 16 extending to the rear from the housing 11; and a height-adjusting grip 18 provided to the upper-left part of the housing 11.

The housing 11 is composed of, e.g., a resin-molded article and also serves as a chassis. The engine 15 is laid over and bolted to the upper surface of the housing and thereby integrally assembled therewith. The engine 15 is a vertical engine that has an output shaft 15a extending from a lower end [of the engine] into the housing 11 toward the lawn (not shown) below. The output shaft 15a is a driving shaft that is substantially perpendicular with respect to the lawn (ground).

The blade 14 is attached to the output shaft 15a within the housing 11. The blade 14 is driven by the engine 15, whereby the blade 14 rotates about the output shaft 15a within the housing 11. The engine 15 is used to drive the rear wheels 13, 13 via a variable speed drive (not shown), whereby the lawnmower 10 is propelled forward automatically, and lawnmowing operations are performed.

In the lawnmower 10, the engine 15 causes the blade 14 to rotate, whereby grass is cut away, and airflow (swirl flow) is produced within the housing 11. The swirl flow causes the grass cut by the blade 14 to be carried into and stored in a cut-grass storage unit Bg.

Figure 2:
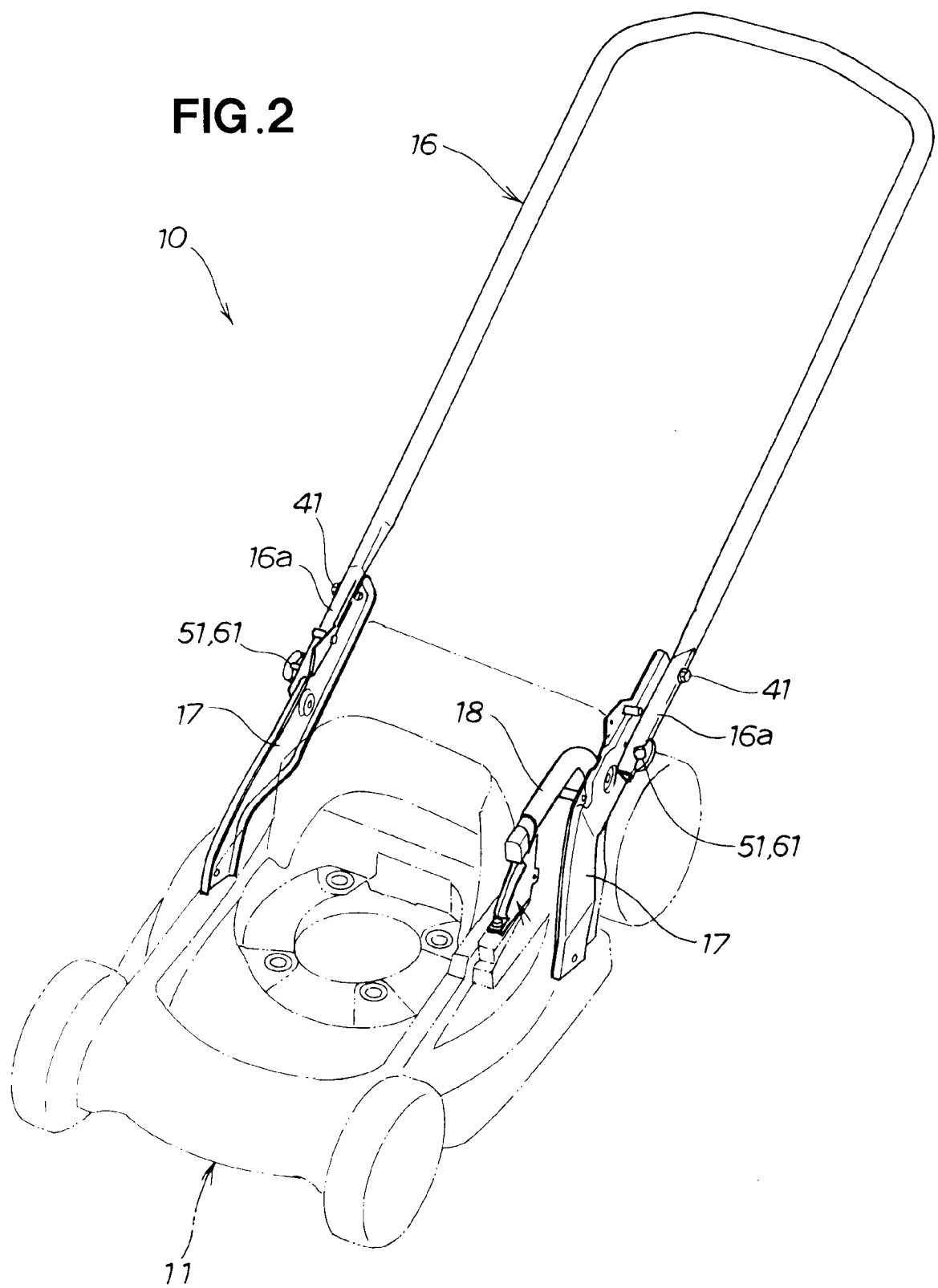
FIG. 2 is perspective view illustrating a housing, an operating handle and a stay of FIG. 1.

The operating handle 16 is formed substantially into the shape of a gate (an inverted U-shape) when the lawnmower 10 is viewed from the front, as shown in FIG. 2. The operating handle can fold at the rear part of the housing 11 via left and right stays 17, 17. In other words, a pair of left and right proximal end parts 16a, 16a of the operating handle 16 is attached to the stays 17, 17, which are present on the rear part of the housing 11, so as to allow forward and backward swiveling. The stays 17, 17 (handle attachment parts) are bolted to the rear part of the housing 11.

Figure 3:
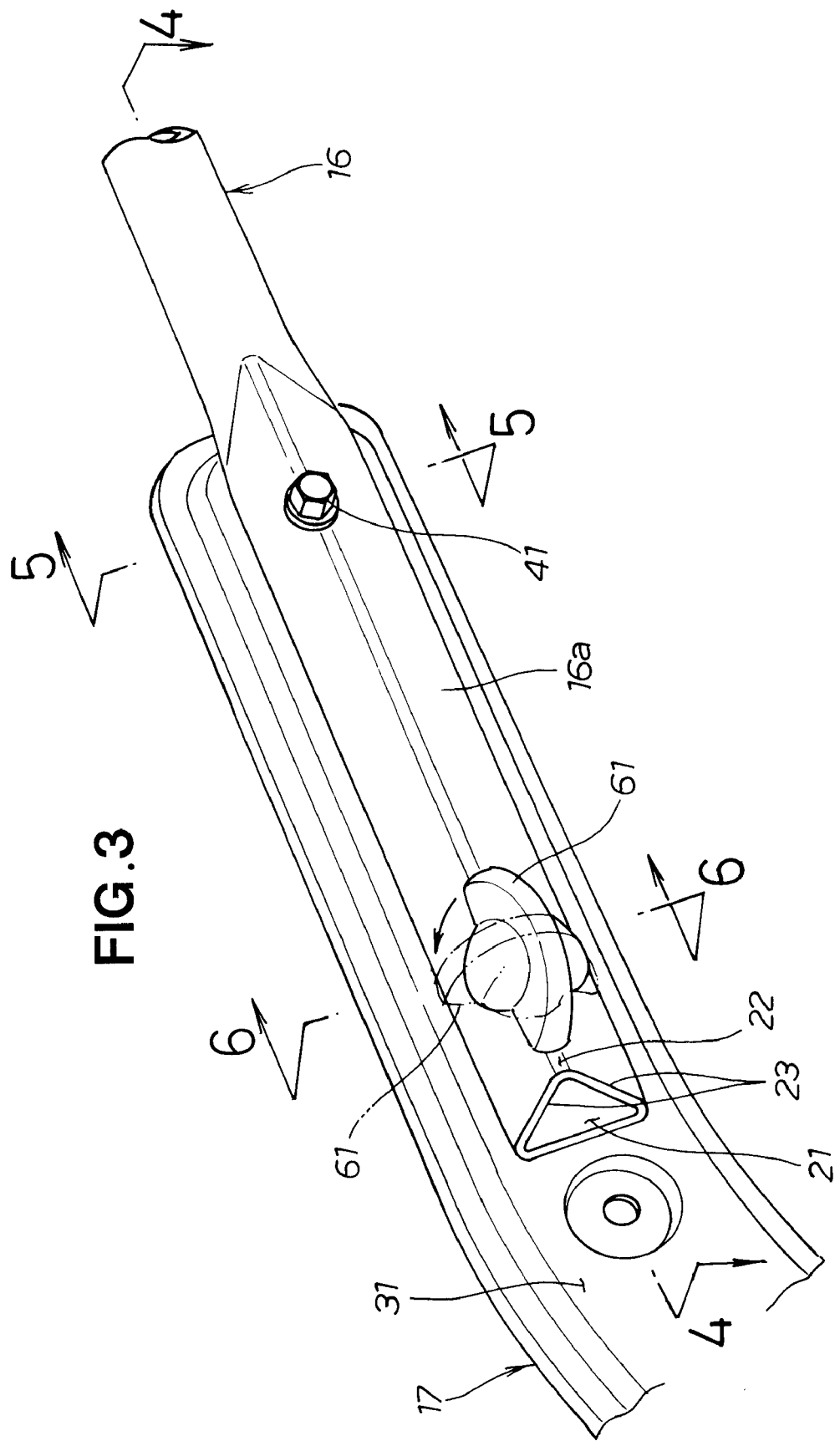
FIG. 3 is a perspective view showing the operating handle of FIG. 2, as attached to the stay.
Figure 4:
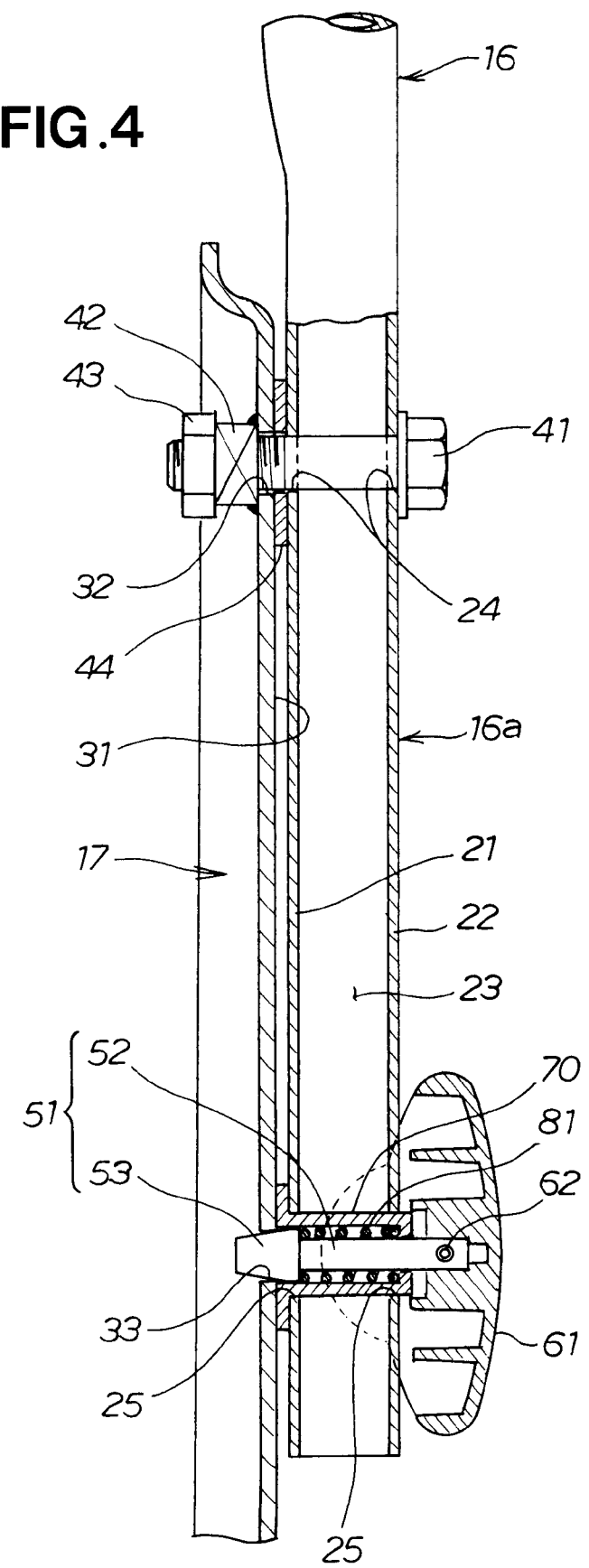
FIG. 4 is a cross-sectional view taken along line 4-4 of FIG. 3.

The operating handle 16 comprises a round pipe, as shown in FIGS. 2 through 4. The left proximal end part 16a of the operating handle 16 is formed by press-molding the round pipe into a shape having a substantially triangular cross-section. Specifically, the cross-section of the left proximal end part 16a is formed in the shape of an isosceles triangle having a flat bottom plate 21 and a top part 22 that faces the bottom plate 21. A surface 31 of the left stay 17 is on the outside in the widthwise direction of the lawnmower 10 and is formed into a flat surface. The left proximal end part 16a is attached to the left stay 17 by a first linking pin 41 and a second linking pin 51.

The first linking pin 41 and the second linking pin 51 are aligned in a row in the longitudinal direction of the left proximal end part 16a. The first linking pin 41 is positioned near, e.g., the distal end of the left stay 17. The second linking pin 51 is positioned in a location removed from the first linking pin 41 in the direction of the proximal end part of the left stay 17.

As shown in FIG. 1, the operating handle 16 can fold about the first linking pin 41 from the usage position shown by the solid lines to the storage position shown by the imaginary lines, and can be locked in the usage position by the second linking pin 51. In other words, when the walk-behind lawnmower 10 is in a state of usage, as shown in FIG. 1, the operating handle 16 is positioned in the usage position and extends upward and to the rear from the stays 17, 17, as shown by the solid lines in FIG. 1. After the second linking pin 51 has been loosened, the operating handle 16 is pushed forward and down, whereby the operating handle 16 is folded forward and positioned in the substantially horizontal storage position, as shown by the imaginary lines in FIG. 1.

The structure for attaching the left proximal end part 16a to the left stay 17 will be described in detail below. The structure for attaching the right proximal end part 16a to the right stay 17 is identical to the structure for attaching the left proximal end part 16a, and a description thereof will be omitted.

The first linking pin 41 and the second linking pin 51 are present on one of the operating handle 16 and the stay 17, as shown in FIG. 4. A first pin-fitting hole 32 for fitting the first linking pin 41 and a second pin-fitting hole 33 for fitting the second linking pin 51 are present on the other of the operating handle 16 and the stay 17.

The first and second linking pins 41, 51 are provided to, e.g., the proximal end part 16a of the operating handle 16, and the first and second pin-fitting holes 32, 33 are, e.g., formed in the stay 17. The proximal end part 16a has a first through-hole 24, through which the first linking pin 41 passes, and a second through-hole 25, through which the second linking pin 51 passes.

Figure 5:
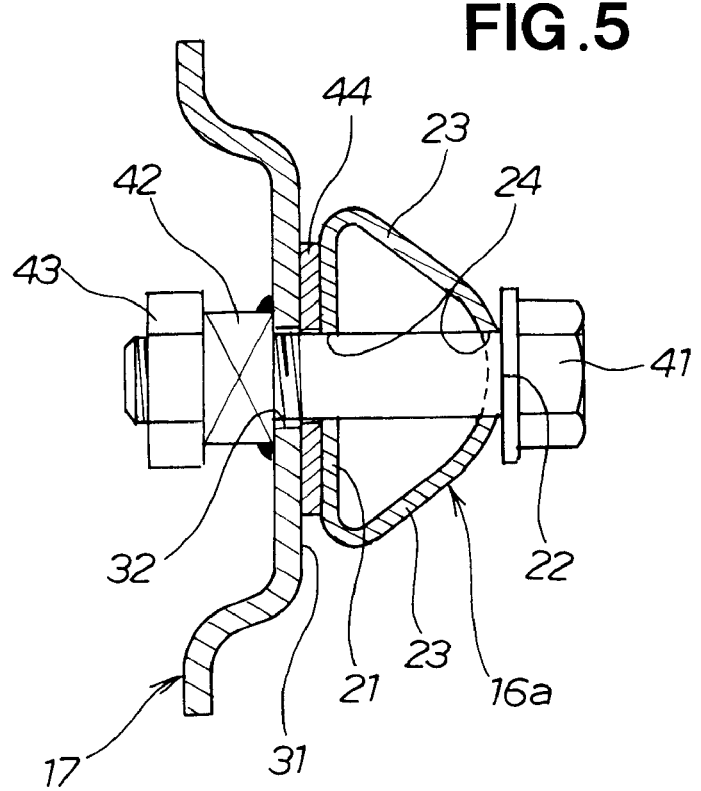
FIG. 5 is a cross-sectional view taken along line 5-5 of FIG. 3.

The first pin-fitting hole 32 is a round hole that passes through the stay 17, as shown in FIGS. 4 and 5. The diameter of the first pin-fitting hole 32 is slightly larger than the diameter of the first linking pin 41. The first linking pin 41 can therefore be smoothly inserted into and retracted from the first pin-fitting hole 32. The first through-hole 24 is a round hole that passes completely through from the bottom plate 21 through the top part 22 of the proximal end part 16a, which is formed having a substantially triangular cross-section. The first linking pin 41 comprises a hexagon-headed bolt or other bolt. The member for screwing in the bolt (first linking pin) 41 is composed of two nuts: a welded nut 42 that is welded to the back surface of the stay 17, and a locknut 43 for further screwing-in of the bolt 41 that is screwed into the welded nut 42. The configuration for screwing the bolt 41 into the two nuts 42, 43 is a structure for locking the bolt 41 in place via the nuts 42, 43.

The procedure for using the first linking pin 41 to attach the proximal end part 16a to the stay 17 is as follows.

The bottom plate 21 of the proximal end part 16a is first overlaid on the outside surface 31 of the stay 17 with a flat washer 44 disposed therebetween, and the bolt 41 (first linking pin 41) that is passed through the first through-hole 24 is screwed into the welded nut 42. In this instance, the degree to which the bolt 41 is screwed in the welded nut 42, as well as the torque with which the bolt is fastened therein, are set so that the proximal end part 16a can swing (rotate) backward and forward about the first linking pin 41 with respect to the stay 17.

The bolt 41 that is screwed into the welded nut 42 is then further screwed into the locknut 43, whereby the bolt 41 is locked in place, and the operation is complete.

The configuration in which the proximal end part 16a is attached to the stay 17 using the first linking pin 41 is thus the first linking pin 41 (comprising a bolt), welded nut 42, and locknut 43, once assembled the degree to which the bolt 41 is screwed in the welded nut 42, as well as the torque with which the bolt is fastened therein can therefore be readily managed. The bolt 41 can be reliably fastened to the welded nut 42 using optimal fastening torque so as to allow the operating handle 16 to be fold about the first linking pin 41 from the usage position shown in FIG. 1 to the storage position with respect to the stay 17. After having been fastened, the bolt 41 can be locked in place by the two nuts 42, 43. The fastened state resulting from optimal fastening torque can be maintained for a prolonged period of time.

The bottom plate 21 of the proximal end part 16a and the outside surface 31 of the stay 17 are both flat surfaces. The surface pressure between the bottom plate 21 and the outside surface 31 when the bolt 41 is screwed into the welded nut 42 can therefore be set and maintained at a more appropriate value.

Figure 6:
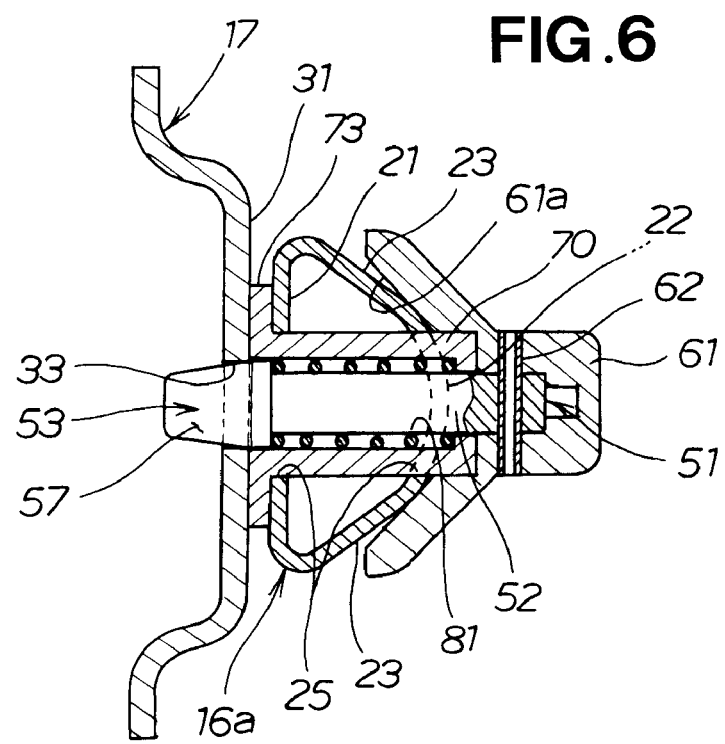
FIG. 6 is a cross-sectional view taken along line 6-6 of FIG. 3.
Figure 7A:
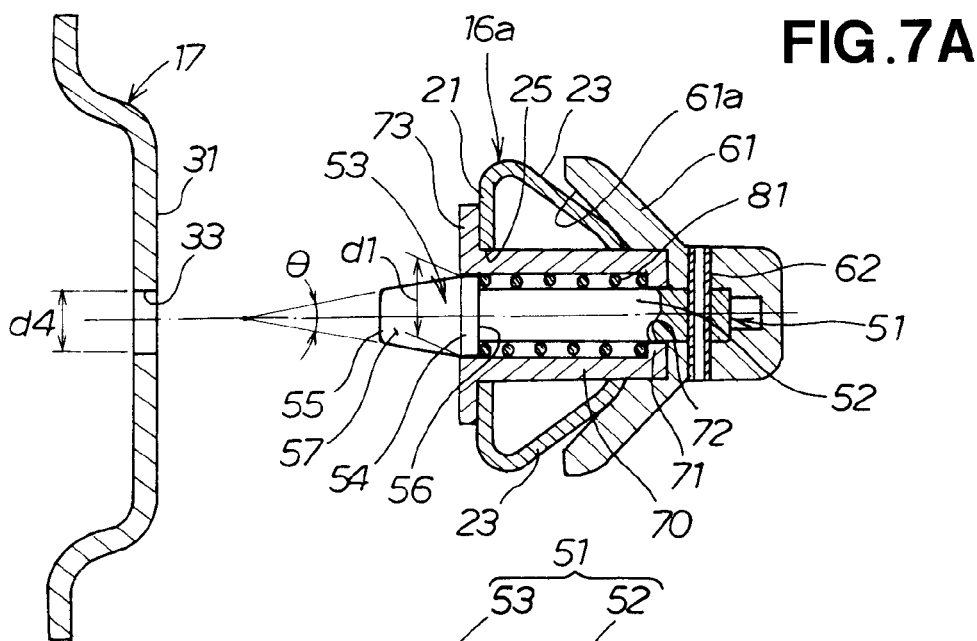
FIG. 7A is an exploded view of the stay and the operating handle of FIG. 6.
Figure 7B:
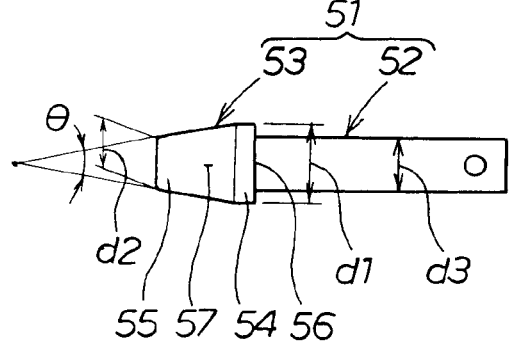
FIG. 7B is a schematic view showing a second linking pin of FIG. 7A.

FIG. 6 shows the proximal end part 16a in a state of attachment to the stay 17. FIG. 7A shows a state in which a distal end part 53 of the second linking pin 51 protrudes outward from the proximal end part 16a when the proximal end part 16a has been removed from the stay 17 (a state in which a knob 61 is at the position shown by the solid lines in FIG. 3). FIG. 7B shows only the second linking pin 51.

As shown in FIGS. 4, 6, and 7A, the second through-hole 25 is a round hole that passes completely through from the bottom plate 21 through the top part 22 (FIG. 6) of the proximal end part 16a, which is formed having a substantially triangular cross-section.

The second linking pin 51 is an integrally-molded member composed of a rod part 52, which is shaped as thin, round bar; and the distal end part 53, which is formed integrally with the distal end of the rod part 52. The end of the rod part 52 opposite from the distal end part 53 is attached to the knob 61 by a pin 62. A bottom 61a of the knob 61 is covered by the top part 22 of the proximal end part 16a, which is formed having a substantially triangular cross-section. The bottom of the knob is formed as a tapered concave surface substantially along two slanted regions 23, 23 of the triangular shape.

As shown in FIGS. 7A and 7B, the distal end part 53 is formed to taper towards the distal end at a taper angle θ. In the distal end part, a diameter d2 of a small-diameter end 55 on the distal end is smaller than a diameter d1 of a large-diameter end 54 at the base attached to the distal end of the rod part 52 (d1>d2). The diameter d1 of the large-diameter end 54 at the attachment base is larger than a diameter d3 of the rod part 52 (d1>d3). An end surface 56 of the attachment base, the end surface facing the distal end of the rod part 52, is called the spring-receiving surface 56.

The second pin-fitting hole 33 is a round hole that passes through the stay 17 and allows the distal end part 53 to be inserted and retracted. A diameter d4 of the second pin-fitting hole 33 is smaller than the diameter d1 of the large-diameter end at the attachment base and is larger than the diameter d2 of the small-diameter end 55 on the distal end (d1>d4>d2). The so-configured second pin-fitting hole 33 can lock the operating handle 16 shown by the solid lines in FIG. 1 in the usage position when fit to a tapered surface 57 of the distal end part 53.

The second linking pin 51 is fit into the second through-hole 25 of the proximal end part 16a, with a sleeve 70 being interposed therebetween. The diameter of the second through-hole 25 is set to a size that allows the sleeve 70 to be inserted and retracted. The sleeve 70 is a cylindrical member having a closed end. The bottom plate 71 has a through-hole 72 through which the rod part 52 passes. On the outer circumference of the aperture end of the sleeve is a flat, circular, plate-shaped flange 73. The distal end part 53 is capable of extending from and withdrawing into (sliding in) the sleeve 70.

The rod part 52 protrudes out from the through-hole 72 of the bottom plate 71 toward the knob 61 and is attached to the knob 61. The bottom 61a of the knob 61 therefore contacts the bottom plate 71 of the sleeve 70. The flange 73 overlays the bottom plate 21 of the proximal end part 16a. The proximal end part 16a is therefore sandwiched by the bottom 61a of the knob 61 and the flange 73.

An urging member 81 is interposed between the bottom plate 71 of the sleeve 70 and the spring-receiving surface 56 of the second linking pin 51 within the sleeve 70. The urging member 81 urges the distal end part 53 in a direction for protruding outside from the aperture end of the sleeve 70; i.e., in a direction for inserting the distal end part 53 into the second pin-fitting hole 33. The urging member 81 urges in a direction in which contact is made between the bottom 61a of the knob (31 and the bottom plate 71 of the sleeve 70. The so-configured urging member 81 comprises, e.g., a compression coil spring. The compression coil spring 81 is wrapped around the rod part 52.

The procedure for assembling the second linking pin 51 with the proximal end part 16a shall now be described. The rod part 52, which has been passed through compression coil spring 81, is first inserted into the sleeve 70, as shown in FIG. 7A. As a result, the distal end of the rod part 52 is exposed through the bottom plate 71 of the sleeve 70. The sleeve 70 is then inserted into the second through-hole 25 from the direction of the bottom plate 21 of the proximal end part 16a in this semi-assembled state. As a result, the sleeve 70 passes through the second through-hole 25. The exposed distal end of the rod part 52 is then inserted into a fitting hole of the knob 61, and the bottom 61a of the knob 61 is made to overlay the bottom plate 71 of the sleeve 70. The knob 61 is then secured to the rod part 52 by a pin 62 in this state, and the assembly operation is completed. As a result, the bottom 61a of the knob 61 is covered by the top part 22 (see FIG. 6) of the proximal end part 16a, which is formed having a substantially triangular cross-section, and is in contact with the two slanted regions 23, 23 of the triangle shape. The bottom 61a of the knob 61 is urged by the compression coil spring 81 in a direction in which contact is made with the slanted regions 23, 23.

Operations for attaching and detaching the second linking pin 51 with respect to the second pin-fitting hole 33 shall now be described. FIG. 6 shows a state in which the tapered surface 57 of the distal end part 53 is fit into the second pin-fitting hole 33, which is a round hole. The bottom 61a of the knob 61 is in contact with the slanted regions 23, 23 at this point and is oriented as shown by the solid lines in FIG. 3 (in the locked position). The operating handle 16 shown in FIG. 1 is maintained locked in the usage position.

Figure 8:
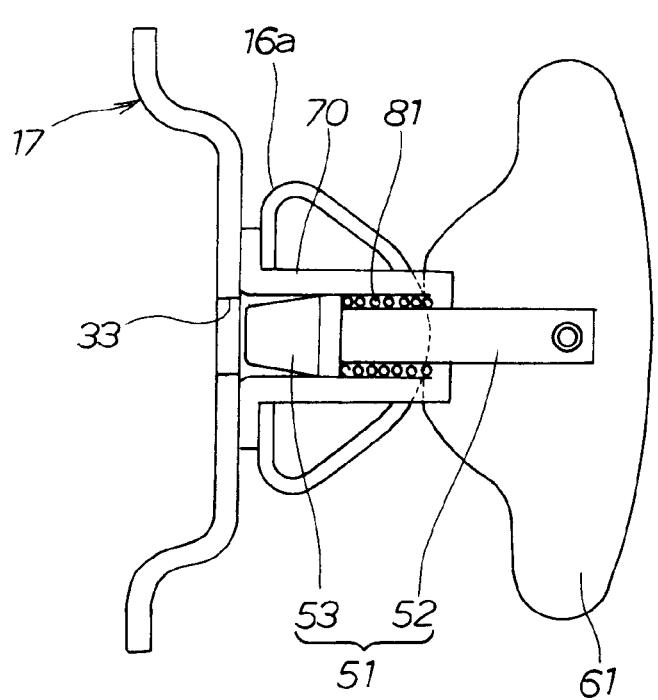
FIG. 8 is a schematic view showing the second linking pin of FIG. 6, as separated from a second pin-fitting hole.

The knob 61 is thereafter turned approximately 90° (unlocked), as shown by the imaginary lines in FIG. 3. The bottom 61a of the knob 61 shown in FIG. 6 thereupon rides up on the top part 22 against the urging force of the compression coil spring 81. The second linking pin 51 is therefore pulled out from the second pin-fitting hole 33, as shown in FIG. 8. As a result, the second linking pin 51 is separated from the second pin-fitting hole 33. Therefore, the operating handle 16 (see FIG. 1) is pushed forward and down while the knob 61 is manually held in the usage position shown by the imaginary lines in FIG. 3, whereby the operating handle 16 can be folded about the first linking pin 41 in relation to the stay 17 from the usage position to the storage position.

The operating handle 16 (FIG. 1) is thereafter returned to the usage position from the storage position, and the knob 61 is returned to the position shown by the solid lines in FIG. 3 (the locked position). The second linking pin 51 is thereupon fit into the second pin-fitting hole 33 by the urging force of the compression coil spring 81, as shown in FIG. 6. As a result, the operating handle 16 shown in FIG. 1 is maintained locked in the usage position.

Fitting the distal end part 53 of the second linking pin 51 into the second pin-fitting hole 33 thus allows the operating handle 16 to be locked in the usage position. Pulling the distal end part 53 of the second linking pin 51 out of the second pin-fitting hole 33 allows the operating handle 16 to be folded from the usage position to storage position.

The distal end part 53 of the second linking pin 51 is formed to taper towards the distal end. Therefore, substantially no gap is present between the tapered surface 57 of the distal end part 53 and the second pin-fitting hole 33 when the tapered surface 57 is fit into the second pin-fitting hole 33. The operating handle 16 can therefore be kept in a stably locked state with respect to the stay (handle-attachment part) 17 when the operating handle 16 is locked in the usage position. Specifically, relative vibration (wobbling or rattling) of the operating handle 16 with respect to the stay 17 can be prevented from occurring. Vibration from, e.g., the engine 15 (see FIG. 1) or from the housing 11 itself is therefore not readily amplified when transmitted from the housing 11 to the operating handle 16 via the stay 17. The burden on the operator steering the lawnmower 10 can therefore be reduced.

In the lawnmower 10, frequent repetition of operations for folding and unfolding the operating handle 16, as well as the large forces frequently acting on the operating handle 16 during operation, may wear down the edge that forms the second pin-fitting hole 33, as well as the tapered surface 57. Since the distal end part 53 of the second linking pin 51 is formed to taper toward the distal end, substantially no gap is present between the tapered surface 57 and the second pin-fitting hole 33 even in such instances. The locked state of the operating handle 16 with respect to the stay 17 can therefore be stably maintained for long periods of time.

The first and second through-holes 24, 25 can be formed using a drill 91 in the present embodiment, as shown in FIGS. 9B and 9C. A drilling machine or other machine tool is employed in such instances. An example of a hole-forming procedure for forming the first and second through-holes 24, 25 in the proximal end part 16a shall now be described.

First, the proximal end part 16a, which is formed having a substantially triangular cross-section, is set in a jig 92, as shown in FIG. 9A. The jig 92 has a tapered supportive concave part 92a for supporting the two slanted regions 23, 23 of the proximal end part 16a. Since the slanted regions 23, 23 are set on the supportive concave part 92a, the bottom plate 21 of the proximal end part 16a faces the drill 91.

A hole is then formed by the drill 91 [moving] from the direction of the bottom plate 21 toward the top part 22. Specifically, a hole is formed in the bottom plate 21, and a hole is subsequently formed in the top part 22, as shown in FIG. 9B. As a result, the first and second through-holes 24, 25 are formed in the proximal end part 16a, as shown in FIG. 9C.

In contrast, the first and second through-holes 24, 25 could also be formed using press working (punching), as shown in FIGS. 10A through 10E. The method for hole forming shown in FIGS. 10A through 10E is given as a comparative example. A hole-forming procedure for forming the first and second through-holes 24, 25 in the proximal end part 16a according to this comparative example shall now be described.

First, the proximal end part 16a is set in a die 101, as shown in FIG. 10A. The die 101 has a tapered supportive concave part 101a for supporting the two slanted regions 23, 23 of the proximal end part 16a. Since the two slanted regions 23, 23 are set on the supportive concave part 101a, the bottom plate 21 of the proximal end part 16a faces upward.

A punch 102 is then used to punch from the direction of the bottom plate 21 toward the top part 22, whereby the holes are formed. Specifically, the holes are formed simultaneously from the bottom plate 21 through the top part 22, as shown in FIG. 10B. As a result, the first and second through-holes 24, 25 are formed in the proximal end part 16a, as shown in FIG. 10C.

When holes are formed using press working, the punching force of the punch 102 inevitably causes the bottom plate 21 to cave in to a greater or lesser extent toward the top part 22, as shown in FIG. 10C. When the proximal end part 16a is assembled with the stay 17 in this state, the contact surface area of the bottom plate 21 in relation to the stay 17 is small, as shown in FIGS. 10D and 10E. Accordingly, there is scope for improvement, particularly for purposes of using the first linking pin 41 to reliably fasten the proximal end part 16a to the stay 17 using an appropriate fastening torque. Furthermore, managing the tolerance of the diameters of the first and second through-holes 24, 25 is not easy when punching using the punch 102.

In contrast, the first and second through-holes 24, 25 in the present embodiment are round holes formed using the drill 91, as shown in FIG. 9. Using a hole-forming method in which a drill is employed thus allows the tolerance of the hole diameters to be relatively easily managed in comparison to using other methods for forming holes (using a press or another method). The fitting gap between the first through-hole 24 and the first linking pin 41 and the fitting gap between the second through-hole 25 and the second linking pin 51 can therefore readily be substantially eliminated, as shown in FIG. 4. The operating handle 16 can therefore be kept in a more stably locked state with respect to the stay 17 when the operating handle 16 is locked in the usage position.

The walk-behind work machine 10 in the present invention is not limited to lawnmowers; it can also be applied to, e.g., weed cutters and carts.

The walk-behind work machine of the present invention is ideally applied to rotary lawnmowers.

Obviously, various minor changes and modifications of the present invention are possible in light of the above teaching. It is therefore to be understood that within the scope of the appended claims the invention may be practiced otherwise than as specifically described.

What is claimed is:

1. A walk-behind work machine comprising:
    a work-machine body;
    a handle-attachment part provided to the work-machine body, said handle-attachment part defining a first pin-fitting hole and a second pin-fitting hole; and
    an operating handle that is linked to the handle-attachment part, said operating handle having first and second linking pins, said first linking pin extending through said first pin-fitting hole while said second linking pin extending through said second pin-fitting hole,
    wherein the operating handle is attached to the handle-attachment part in such a manner as to be swingable about the first linking pin from a usage position to a storage position,
    the second linking pin has a distal end part, and
    the distal end part has a tapered surface formed such that a diameter decreases toward a distal end thereof,
    the distal end part of the second linking pin extends into said second pin fitting hole to fix the second linking pin within the second pin-fitting hole and withdraws from said second pin fitting hole to release the second linking pin from the second pin-fitting hole,
    wherein the operating handle is locked in the usage position when the distal end part of the second linking pin extends into the second pin-fitting hole, and,
    wherein the first linking pin comprises a bolt, a welded nut welded to the handle-attachment part in which the bolt is threadingly received, and a locknut threaded over the bolt and into engagement with the welded nut and serving to hold the bolt in a fixed position relative to the welded nut and thereby set a desired engagement pressure between the operating handle and the handle attachment part, whereby the first linking pin retains the operating handle on the handle attachment part such that the operating handle may be rotated relative to the handle attachment part when the second linking pin is released from the second pin-fitting hole.

2. The walk-behind work machine according to claim 1, wherein the first pin-fitting hole is spaced a first distance from the work-machine body, and the second pin-fitting hole is spaced a second distance from the work-machine body, said first distance being greater than said second distance.

* * * * *